Feb. 16, 1937.     M. SEIGLE ET AL     2,070,755
FISHING LURE
Filed Aug. 12, 1935
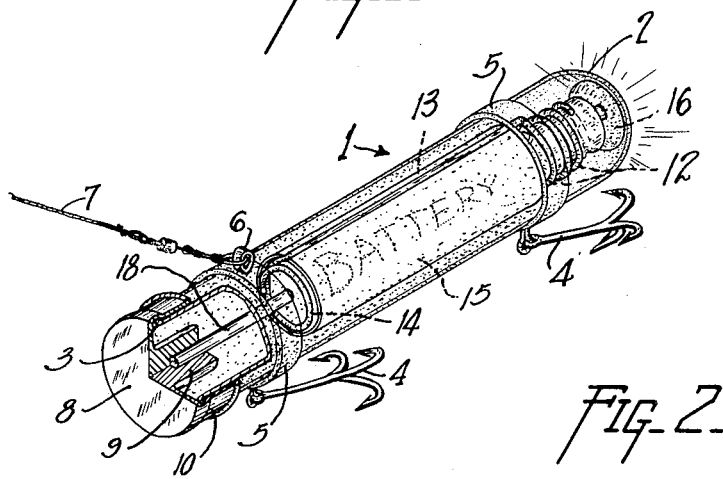
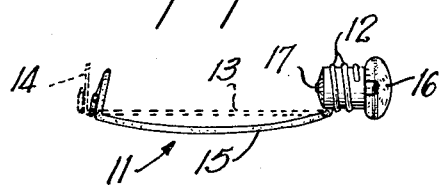
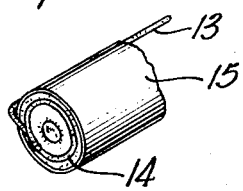
Maurice Seigle
William Seigle
INVENTORS.
BY Loyal J. Miller
ATTORNEY Patented Feb. 16, 1937

2,070,755

UNITED STATES PATENT OFFICE 2,070,755

FISHING LURE

Maurice Seigle and William Seigle, Hinton, Okla.

Application August 12, 1935, Serial No. 35,766

4 Claims. (Cl. 43—44)

Our invention relates to fishing plugs, and particularly to plugs using a light as a means for attracting the fish, and which may be used either as a submerged or surface lure.

The objects of our invention are to provide a device of this class which is new, novel, practical and of utility; which is comparatively light; which is simple, and has few parts; which provides for the application of a light at the extreme rear end of the plug for attracting the "strike" of a fish at that point which is the natural point of attack by a fish following a plug or lure drawn through the water; which is transparent, making the plug visible for a greater distance; which is simply, easily and quickly sealed; which will carry the battery safely while disconnected from the light bulb; which is so made as to prevent the movement of the battery and light within the container; the battery and bulb of which can be easily and quickly changed; the battery and electric bulb holder of which is extremely simple and cheap to manufacture; and, which will be efficient in accomplishing all the purposes for which it is intended.

Most of the fishing plugs in use at the present time are complicated, and comparatively expensive in manufacture; the housings of most of them are composed of two or more parts and are fitted together by a large number of threads so as to make them water-tight. Since most of them are fitted with two or more sets of three-way hooks, it is inconvenient and dangerous to screw the separate parts together, each part usually having at least one set of said hooks. Those providing a light have the same disposed at the front end of the plug instead of at the rear end.

Our invention obviates these disadvantages and provides a device which will tend to better attract and catch the fish.

With these and other objects in view as will more fully appear hereinbelow, our invention consists in the construction, novel features, and combination of parts hereinafter more fully described, pointed out in the claims hereto appended, and illustrated in the accompanying one-sheet drawing, of which, Figure 1 is a perspective view, portions being broken away, and portions being shown in section;

Figure 2 is a side elevational view of the electric bulb and holder, showing in dotted lines the position assumed when a battery is in place; and, Figure 3 is a fragmentary detail of one end of the battery and holder.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof; and it is also understood that the drawing is to be interpreted as being illustrative and not restrictive.

The inventive idea involved is capable of receiving a variety of mechanical expressions one of which, for the purpose of illustrating the invention, is shown in the accompanying drawing wherein:—

The reference numeral 1 indicates a preferably tubular housing of a suitable transparent material having one closed end 2 and an open end having a peripheral bead 3 surrounding its orifice. The housing 1 is provided with a plurality of fish hooks 4 attached thereto in any suitable manner, for instance, by bands 5 and is also provided with an eye 6 or other means for the attachment of a fish line 7. A rubber closure 8 having a central inwardly projecting portion 9 is provided for closing the open end of the housing. The closure 8 is provided at its outer edge with an annular flexible sleeve portion 10 which fits over the bead 3 and acts to hermetically hold the closure in place. The closure 8 is similar in form to the closure usually used in serum vials.

As a means for providing a light within the closed end 2 of the housing we provide a combination battery and electric bulb holder 11 formed of a single piece of wire and embodying at one end coils 12 into which the bulb 16 is threaded, an elongated portion 13 extending from the coils 12 and terminating in a single annular coil 14. The coils 12 and the coil 14 lie at similar angles from the portion 13 and in substantial alinement with each other. Normally the portion 13 is slightly curved as shown in solid lines in Fig. 2, and the coil 14 leans slightly toward the coils 12. When a dry cell battery 15 is disposed between the contact end 17 of the bulb 16 and the annular coil 14 of the holder the portion 13 is forced to straighten out as shown in dotted lines in Fig. 2, and the annular portion 14 is then forced to assume a position substantially at right angles to the portion 13. The inherent resiliency of the holder 11 acts to maintain the central contact of one end of the battery in positive engagement with the contact point 17 of the bulb 16 and the annular portion 14 of the holder makes contact with the opposite end of the battery to complete the circuit.

In order that housings 1 of various sizes may be used with a battery 15 and holder 11 of a single size, we provide a preferably non-conductive rod 18 one end of which is seated in a socket in the portion 9 of the closure 8 and the other end of which bears firmly against the adjacent end of the battery 15. The rod 18 may be made of any desired length according to the length of housing being used.

From the foregoing description it may be seen that the electrical portion of the device is extremely simple, having only one part beside the battery and bulb. Also, that the entire device is extremely simple since the housing consists substantially only of a tube and a cap. Further, that the cap may be easily and quickly removed in order to replace or remove the electrical unit or parts thereof.

When it is desired to use the plug as a day time lure without having the bulb 16 energized the battery is reversed in the holder 11 and the plug then functions as an under-surface lure. For night time fishing, and for fishing in water which is not clear, the battery is disposed as illustrated in Fig. 1 and the bulb is then lighted. The plug then acts as an under-surface lighted lure. If it is found desirable to use the plug as a floating or surface lure, the entire electric unit may be removed. This together with the lightness of the lure enables it to be used on a fly-line and rod. By elongating the housing 1 and the rod 18 sufficient buoyancy may be provided to float the electric unit, whereas, the plug may then be used at night as a lighted surface lure.

Almost invariably, when a fish strikes a moving lure he strikes it from the rear. Attention is particularly directed to the fact that the light bulb of applicants' plug is disposed at the rear of the housing and that there are no projections or protuberances extending beyond the rear end of the housing nor around the same. This attracts the fish to strike at the lighted end of the housing without being impeded. The rearmost one of the fish hooks is located forwardly of the lighting element and the fish is therefore permitted to receive the rear end of the housing where the light is located in his mouth before realizing he is encountering the hook. This, it is thought, tends to give him the impression that he has captured the lure and that it is his and therefore causes him to begin to swallow the same before realizing he has encountered the hook. This lure has been proven in actual practice to be successful in catching fish where lighted lures having a hook positioned rearwardly of the rear end of the plug have not met with such success. The success may lie in the fact that when a fish strikes lures having hooks extending rearwardly of the lighting element, the mouth of the fish has not yet opened or having opened he does not swallow the hooks, but immediately spews them out of his mouth since in fact he is striking at the light and not at something behind or rearwardly of it.

Obviously the invention is susceptible of embodiment in forms other than that which is illustrated in the accompanying drawing and described herein, and applicable for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. A device of the class described, embodying a one-piece hollow transparent hook carrying body having a closed rear end and an open front end, a battery within the body, an electric light bulb, means for holding the battery and bulb in operative connection, a cap for hermetically closing the open end of the housing, means co-acting with the cap for holding the battery, bulb, and holding means stationary within the housing, said bulb being disposed at the rear end of the body, and hooks connected to said body forwardly of said bulb.

2. In a device of the class described, an electric unit including a battery, an electric light bulb, and means for holding the two in operative connection, and a housing for the unit comprising a one-piece hollow transparent body having a rear closed end within which the bulb is housed and having its front end open, a rubber cap for hermetically closing the open end of the body, a fishhook attached to the exterior of the body and forwardly of its rear end, and means for connecting the front portion of the body to a fishing line.

3. In a device of the class described, an electric unit including a battery, an electric light bulb, and means for holding the two in operative connection, and a housing for the unit comprising: a one-piece hollow transparent body having a rear closed end within which the bulb is housed and having its front end open, a rubber cap for hermetically closing the open end of the body, means co-acting with the cap for holding the battery, bulb, and holding means stationary with relation to the body, a fish hook attached to the exterior of the body and forwardly of its rear end, and means for connecting the front portion of the body to a fishing line.

4. In a device of the class described, an electric unit including a battery, an electric light bulb, and means for holding the two in operative connection, and a housing for the unit comprising: a one-piece hollow transparent body having a rear closed end within which the bulb is housed and having its front end open, a rubber cap for hermetically closing the open end of the body, means for holding the battery, bulb, and holding means stationary with relation to the body, a fish hook attached to the exterior of the body and forwardly of its rear end, and means for connecting the front portion of the body to a fishing line.

MAURICE SEIGLE.
WILLIAM SEIGLE.